Feb. 22, 1944.  E. A. ALLEN  2,342,236
METHOD OF AND MEANS FOR BINDING MATCH BOOK ASSEMBLIES
Filed Dec. 11, 1942   7 Sheets-Sheet 4
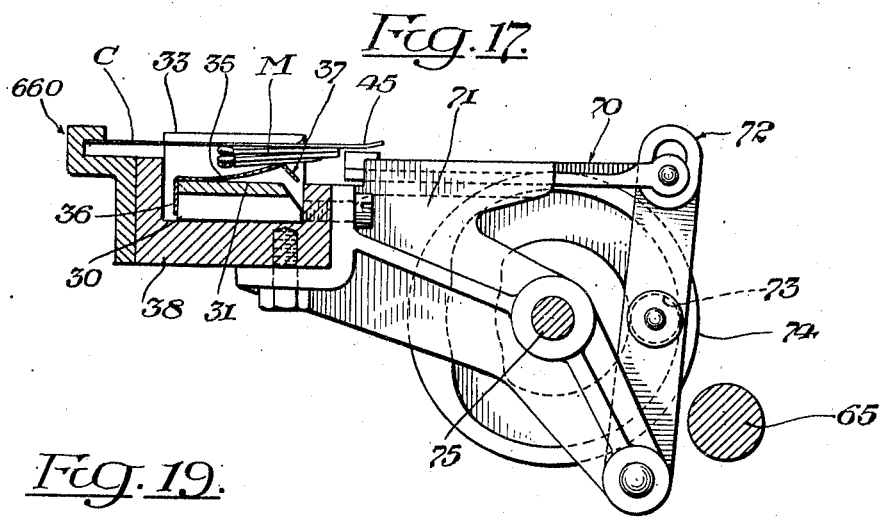
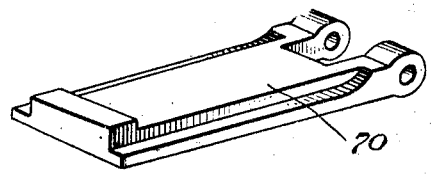
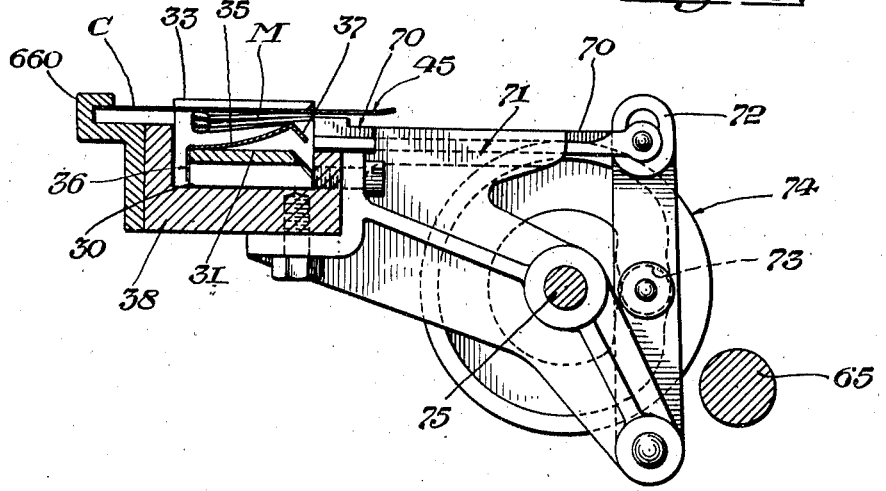
Inventor
Edgar A. Allen
by his Attorney
John R. Nolan Feb. 22, 1944. E. A. ALLEN 2,342,236
METHOD OF AND MEANS FOR BINDING MATCH BOOK ASSEMBLIES
Filed Dec. 11, 1942 7 Sheets-Sheet 5
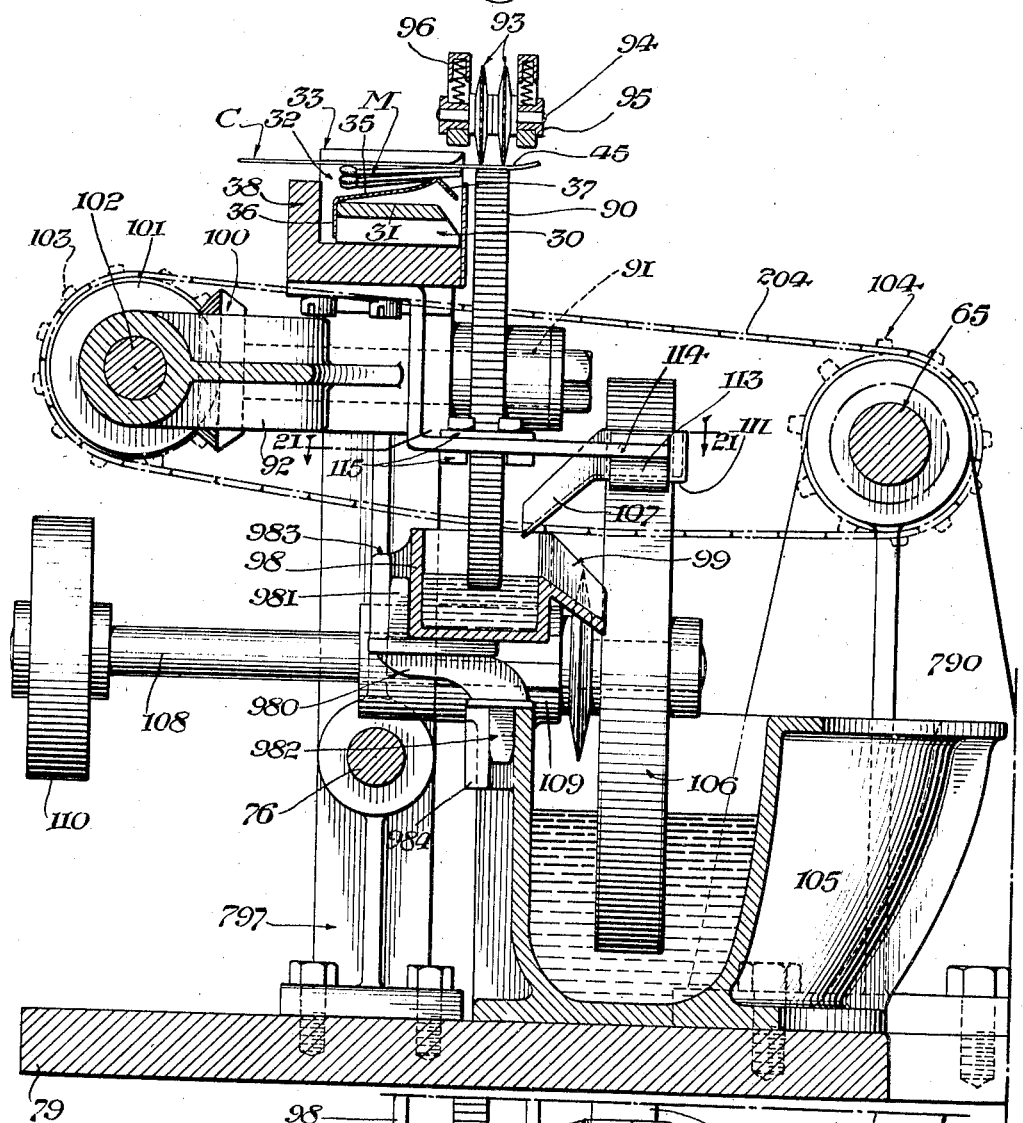
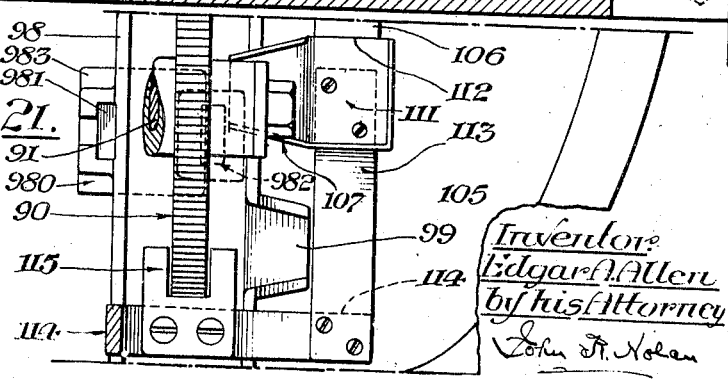

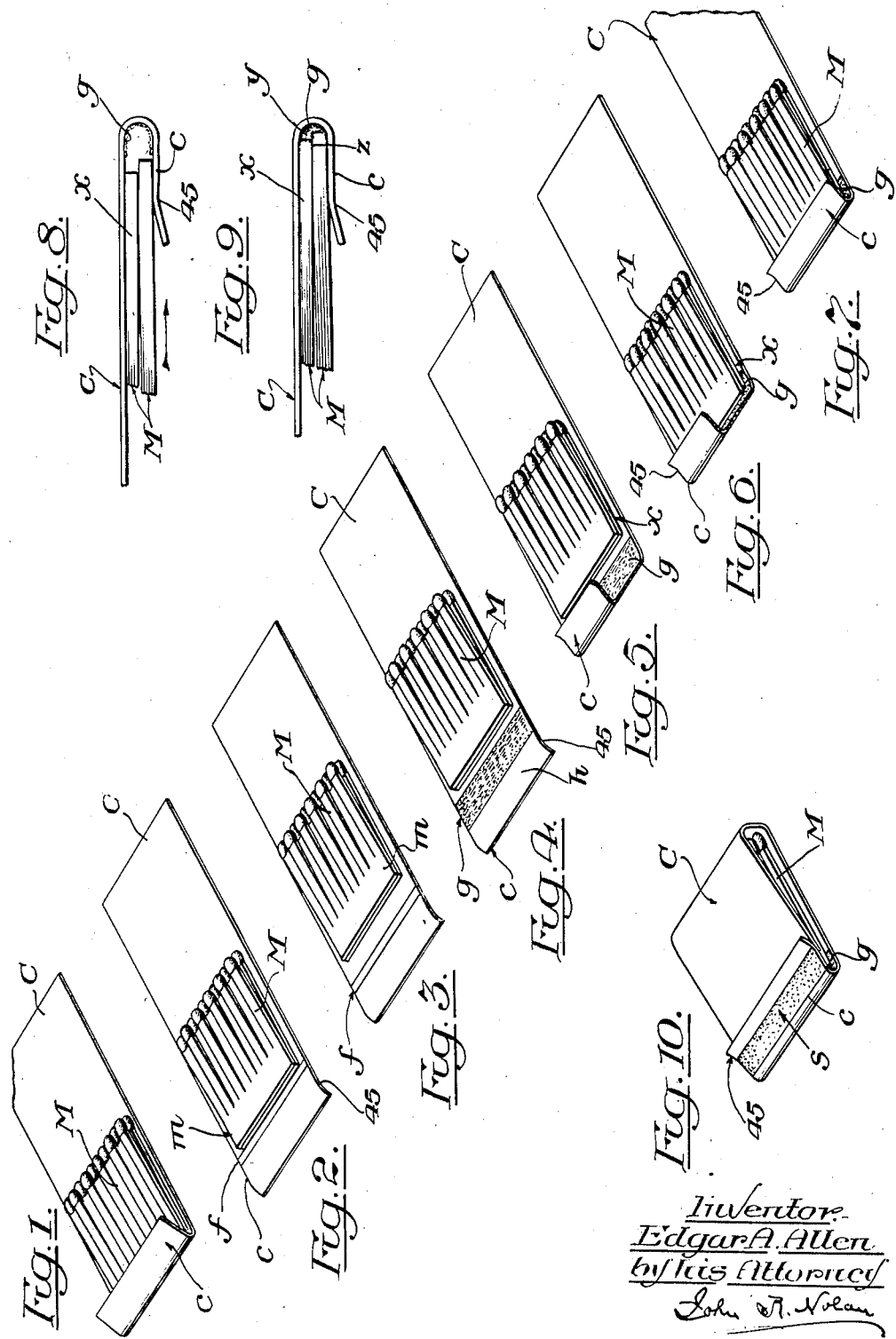

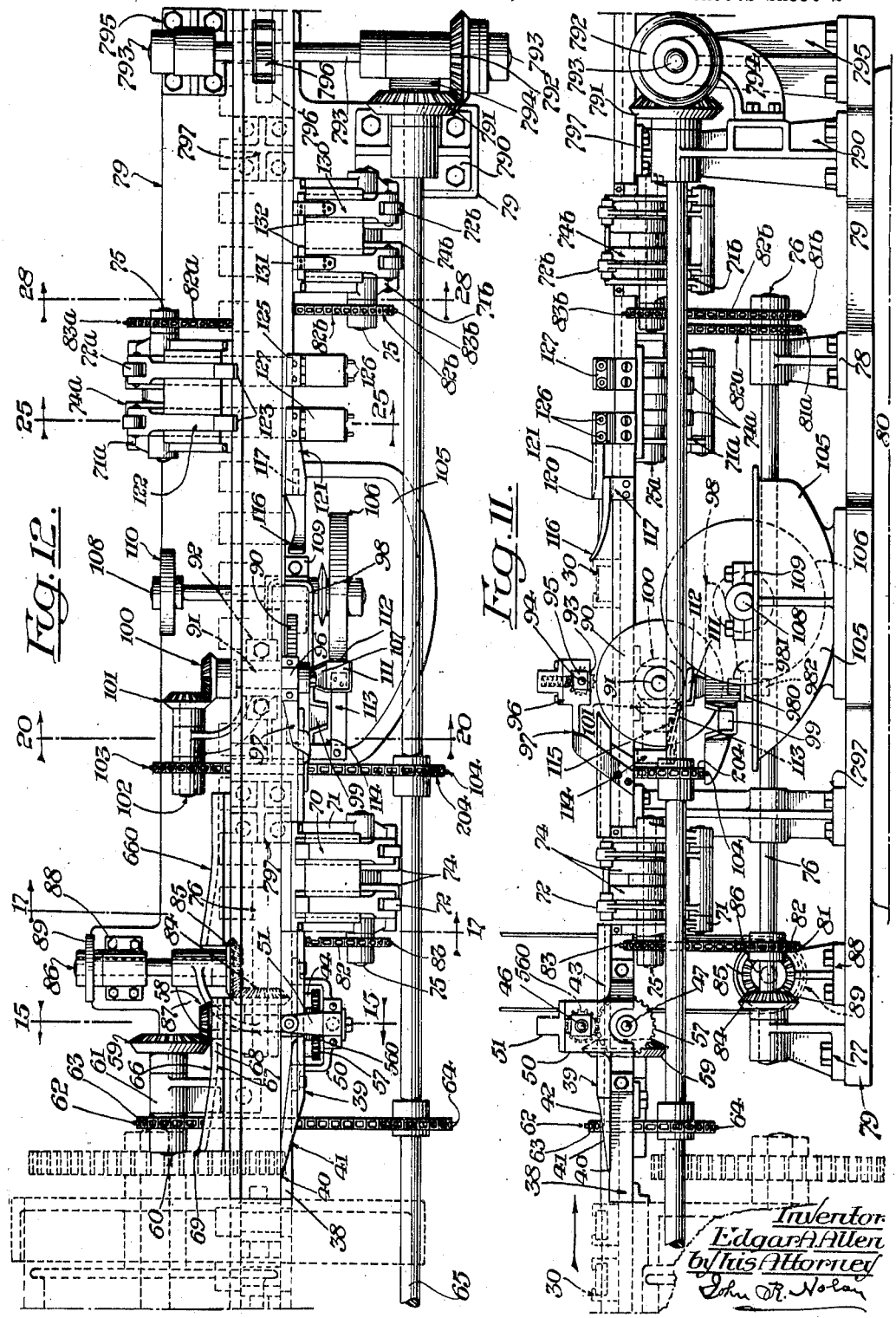

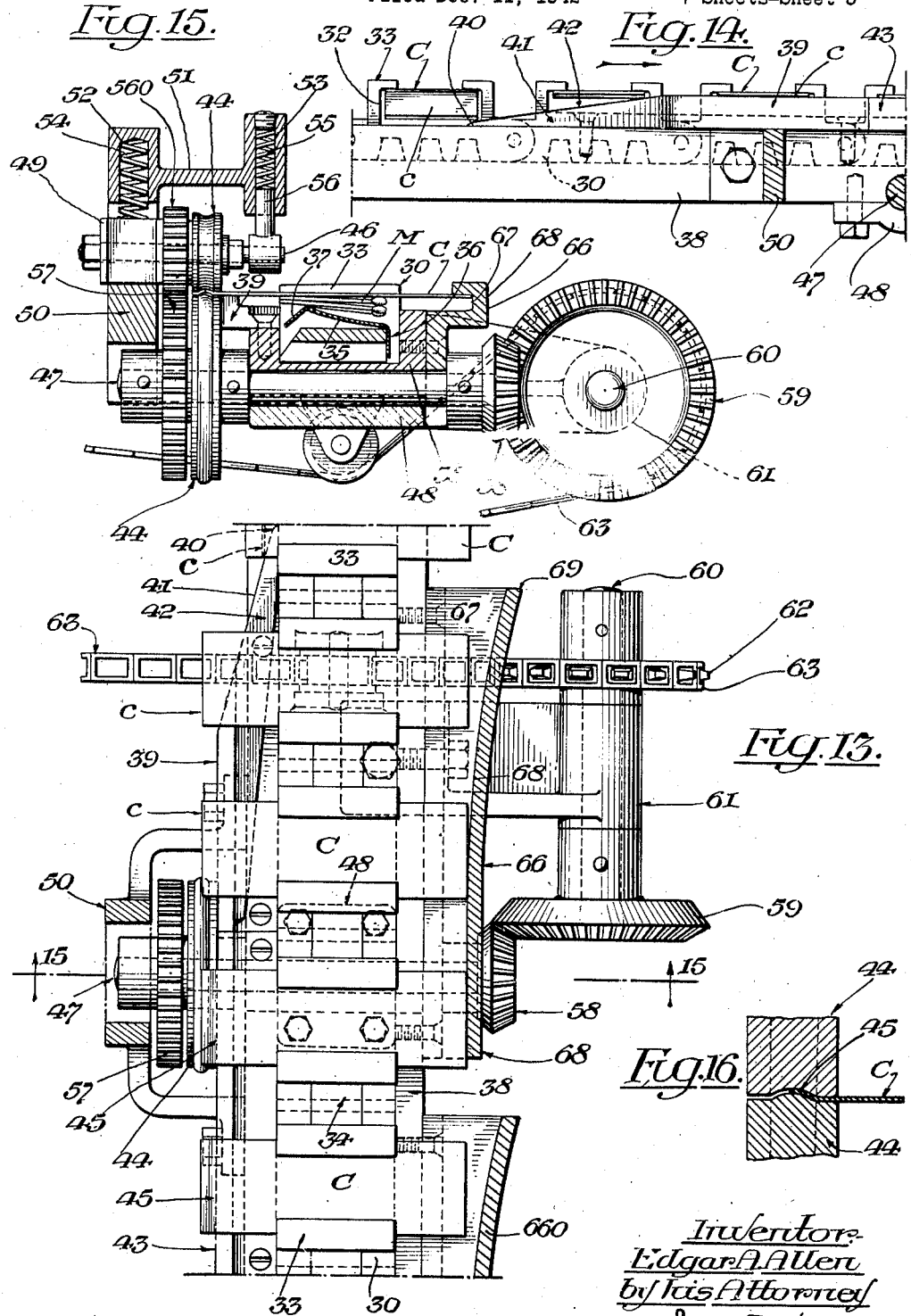

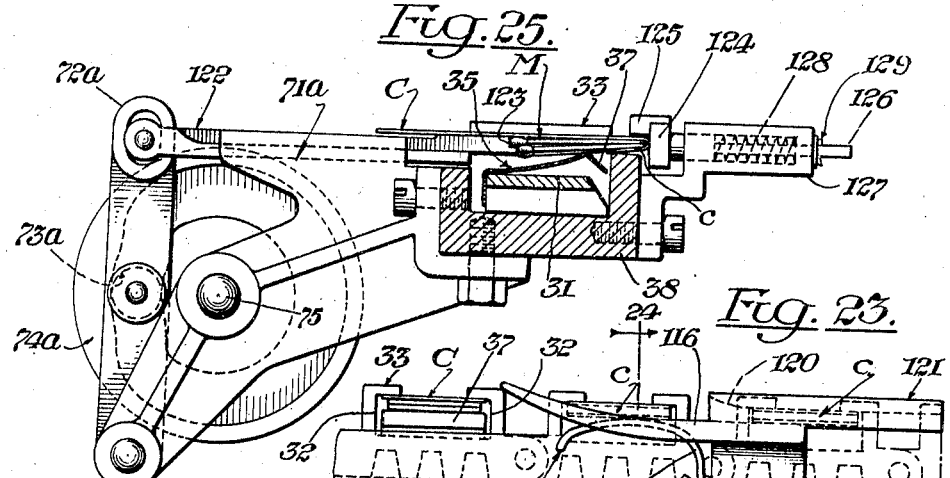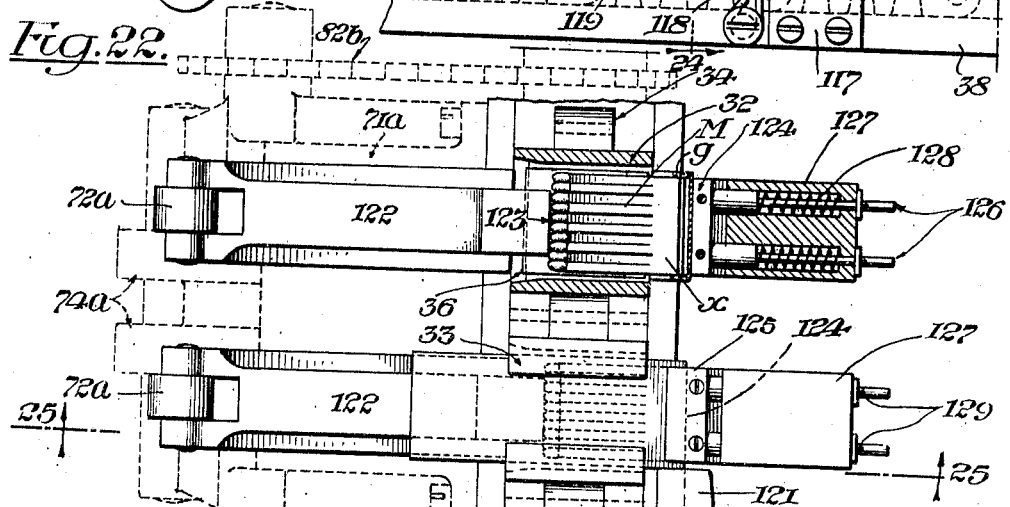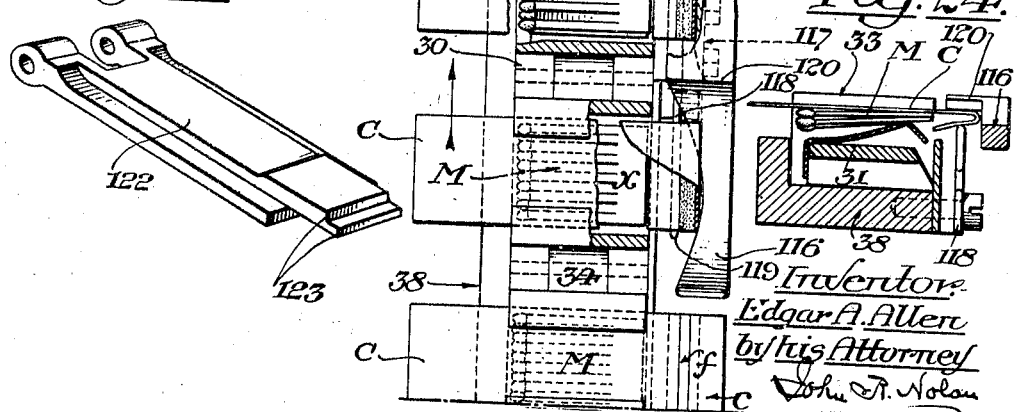

Feb. 22, 1944. E. A. ALLEN 2,342,236
METHOD OF AND MEANS FOR BINDING MATCH BOOK ASSEMBLIES
Filed Dec. 11, 1942 7 Sheets-Sheet 7
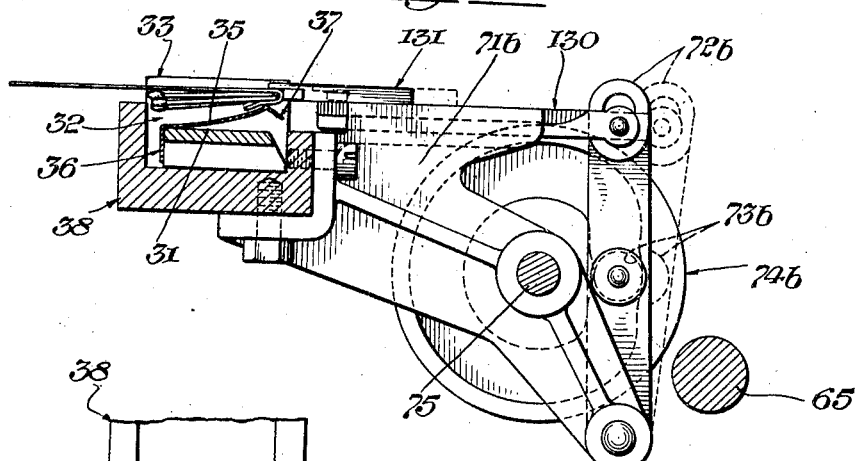
Fig. 28.
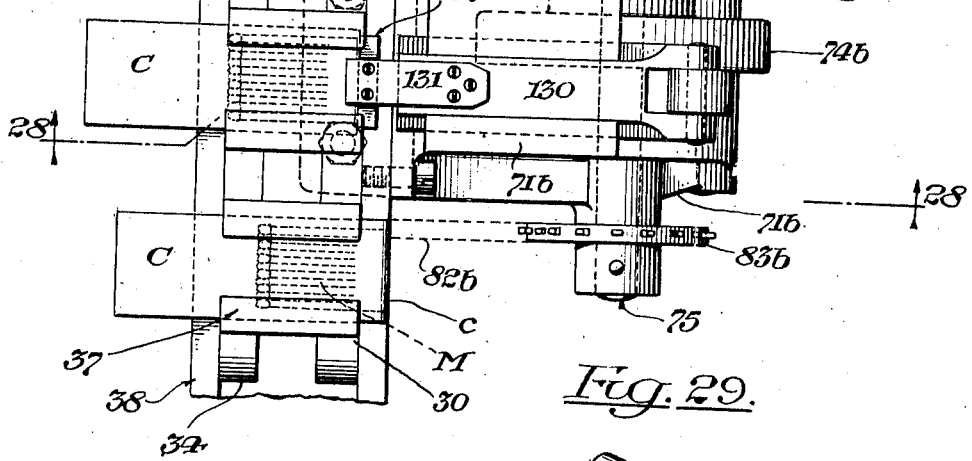
Fig. 27.
Fig. 29.
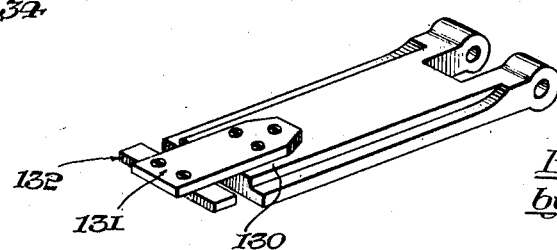
Inventor:
Edgar A. Allen
by his Attorney
John R. Nolan Patented Feb. 22, 1944

2,342,236

UNITED STATES PATENT OFFICE 2,342,236

METHOD OF AND MEANS FOR BINDING MATCH BOOK ASSEMBLIES

Edgar A. Allen, Springfield, Mass., assignor to The Diamond Match Company, New York, N. Y., a corporation of Delaware Application December 11, 1942, Serial No. 468,626

13 Claims. (Cl. 93—2)

This invention relates to a method of and means for uniting the associated match cards and flexible covers of book matches; the principal object of the invention being to provide for the rapid and efficient cementing together of assembled match book elements comprising a plurality of match cards, or "combs," arranged in superposed relation, and also a folded flexible cover whereof the opposite walls closely embrace the uncut bases of the cards.

A method to this end and a constructional means for practicing the same according to my invention are illustrated in the annexed drawings and will be hereinafter described in detail, the scope of the invention being expressed in the appended claims.

In the drawings—

Figures 1 to 7, inclusive, are perspective views illustrating progressive steps in the process of uniting the elements of a conventional match book having a plurality of match cards.

Fig. 8 is a side view, enlarged, of a portion of the associated book elements, showing the offset bases of the advancing match cards as approaching the inner walls at the hinge of the cover fold.

Fig. 9 is a similar view, showing the bases of the cards fully entered within the folded end of the cover.

Fig. 10 is a perspective view of a finished book of matches.

Fig. 11 is a partial rear elevation of a booking machine equipped with card and cover uniting mechanism embodying the principle of my invention, only so much of the machine being shown as is necessary to illustrate the invention.

Fig. 12 is a plan of the mechanism shown in Fig. 11.

Fig. 13 is a transverse horizontal section directly above the portion of the carrier in the vicinity of a cam member for opening, and rolls for creasing, the end folds of the covers borne by the carrier.

Fig. 14 is a partial rear elevation of a portion of the carrier and its guide trough, showing the cam member for opening the end folds.

Fig. 15 is a transverse section in a plane adjacent the creasing rolls, as on the lines 15—15 of Figs. 12 and 13.

Fig. 16 is a fragmentary section at the bite of the creasing rolls, showing the creased or flared edge of the open end fold.

Fig. 17 is a transverse vertical section through a carrier link and its guide trough, as on the line 17—17 of Fig. 12, showing in elevation the adjacent mechanism including a pusher slide for shifting the bases of the match cards inwardly beyond the hinge of the projecting open end of a cover borne by the link, the slide being represented in its retracted or idle position.

Fig. 18 is a similar view showing the pusher slide in its forward or effective position.

Fig. 19 is a perspective view of said pusher slide.

Fig. 20 is a transverse vertical section through a carrier link, the guide trough, the adhesive material applying devices, and adjuncts, as on the line 20—20 of Fig. 12.

Fig. 21 is a partial horizontal section, as on the line 21—21 of Fig. 20.

Fig. 22 is a sectional plan of a portion of the carrier and the guide trough, showing the devices for bending the coated surfaces of the open end folds towards the bases of the adjacent match cards during the movement of the carrier, and also showing a pair of pusher slides for inserting the associated match cards in offset relation within the folded ends of the respective covers.

Fig. 23 is a partial rear elevation of the carrier and the guide trough, showing the end folding devices.

Fig. 24 is a transverse vertical section, as on the line 24—24 of Fig. 23.

Fig. 25 is a similar section, as on the lines 25—25 of Figs. 12 and 22.

Fig. 26 is a perspective view of one of the offsetting pusher slides.

Fig. 27 is a plan of a portion of the carrier and the carrier guide trough, showing mechanism including a pair of pusher slides for shifting the bases of the associated book elements into the links to place the cover folds flatwise against the pinching ends of springs within the links.

Fig. 28 is a transverse vertical section through a carrier link and the guide trough, as on the lines 28—28 of Figs. 12 and 27.

Fig. 29 is a perspective view of one of the pusher slides shown in Figs. 27 and 28 for shifting the base end of the book elements.

As illustrated in Fig. 1 of the drawings the match cards M for each book are arranged flatwise in superposed relation upon a flexible cover C of paperboard or the like having at one end a short fold $c$ which confines the uncut bases $m$ of the cards in the usual manner. In accordance with my invention the end fold $c$ is bent outwardly, as seen in Fig. 2, and the match cards are then moved endwise a relatively short distance to place the bases of the cards beyond the hinge $f$ of the projecting end portion, as seen in Fig. 3. Liquid adhesive material g, such as glue, is then applied to a part of the surface of the projecting end portion adjacent the bases of the cards and in spaced relation to the outer free edge of the projecting portion, as seen in Fig. 4. Such projecting portion is thereafter folded toward the bases of the match cards, as seen in Fig. 5, following which the cards are pushed toward the fold portion, as seen in Figs. 6, 7, 8 and 9, so that the marginal end of that card (x) in contact with the body of the cover is rearwardly offset from the base of the other card when the latter abuts the hinge of the cover fold, thereby providing a step-like channel (y) between the base ends of the associated cards and the hinge of the cover as more clearly seen in Fig. 9. At this stage the adhesive material on the inner walls at the folded portion of the cover is in close proximity to the outer surfaces of the respective match cards. Coincidentally with the movement of the cards to and within the folded end of the cover the leading edges of the bases of the respective cards scrape a portion of the adhesive material from the opposing surfaces of the cover and force the increment into the channel at the cover bend. The base ends of the associated book elements are then pinched together to ensure close lateral contact of the opposing surfaces of the cover fold and the match cards, respectively, thus squeezing between and against the contiguous marginal surfaces of the card bases portions of the adhesive material confined in the channel y, as indicated at z, Fig. 9, and at the same time pressing against the opposing surfaces of the card bases the adhesive material on the inner surfaces of the walls of the cover at its folded end. The book elements thus assembled are held in close lateral contact, under pressure, until the adhesive material has become well set, thus firmly uniting not only the fold and the body of the cover to the respective cards, but also the bases of the two cards to each other. At the same time the uncoated portion h (Fig. 4) of the cover fold (c) affords a retaining lip under which the usual long closure flap constituted by an extension of the opposite end of the body of the cover can be tucked and thus be temporarily held when the book is closed, as seen in Fig. 10, wherein the cover fold is also represented as coated with an exterior stripe S of friction or striking material which may be applied either before or after the introduction of the cover in the booking machine. It is to be noted that the hinged end portion of the cover is substantially reinforced and stiffened by the solidified adhesive material, thus contributing to the efficiency of the union.

Referring more particularly to Figs. 11 and 12 of the drawings, 30 designates a portion of the upper run of an endless chain of links or holders constituting the intermittently movable carrier of the match booking machine disclosed in Patent No. 1,042,472 dated October 29, 1912. To identify the relation of this portion of the carrier to the preceding elements of the booking machine some of the elements are indicated in dotted lines at the left of Figs. 11 and 12.

Each link or holder of the carrier comprises a base 31 with parallel side walls 32 having inwardly overhanging flanges 33 and having also suitably disposed ears 34 by means of which the adjoining links are hingedly connected by pins. Within each link is arranged in the space between the side walls 32 a leaf spring 35 having at its forward end an angular bend 36 which is secured to the adjacent end of the base 31. The spring is inclined upwardly and rearwardly so that its free upper end yieldingly co-acts with the opposing under surfaces of the flanges, such end being slightly curved or bent downwardly, as at 37, in order to present a smooth bearing surface to the cover and cards as they are being forced into and through the link against the pinching action of the spring.

The portion of the carrier herein shown is that immediately following the usual card inserting station where plural match cards are entered in the end-folds of covers borne by the carrier, which carrier portion in its travel advances the associated book elements in succeeding pairs to means for binding the bases of the complementary elements. The upper run of the carrier is supported by a longitudinally extending guide trough, whereof the section at the binding station is indicated at 38, all as fully set forth in Patent No. 1,042,472, aforesaid.

The mechanism now to be described embodying my invention is designed to eliminate the wire stitching unit heretofore employed for binding together the complementary book elements. To this end the machine is equipped with means for opening outwardly each succeeding cover fold immediately after the associated book elements leave the card inserting station, which means in the form shown comprises a cam bar 39 secured to the rearward wall of the guide trough 38 and extending adjacent to and longitudinally of the carrier links. The free or acting end of the cam bar terminates in a reduced nose portion 40 afforded by relatively long bevelled portions 41 and 42 on the outer side and top, respectively, of the bar. As the end-folded covers progress the folds (c) pass under and in contact with the nose of the cam bar and are thus gradually bent outwardly and upwardly until they assume a horizontal position upon the top of the cam bar. (See Figs. 2 and 11 to 14, inclusive.) The fold is maintained in this position for a determined interval of its travel by a cam bar section 43 which is secured to the adjacent wall of the trough and forms in effect a continuation of the cam bar.

During the travel of the open fold portion of each cover upon the bar section 43 the free outer edge of such portion preferably passes between a pair of mating creasing rolls 44 and is thereby upwardly turned or flared, as at 45, to facilitate the tucking of the closure flap under the end fold of the completed book, as seen in Fig. 10. The rolls 44 are fast on upper and lower shafts 46 and 47, respectively, whereof the lower shaft has its bearings in a suitable bracket 48 secured to the bottom of the guide trough 38. The upper shaft 46 comprises a stud projecting from a vertically slidable block 49 mounted in an upstanding guide member 50 secured to the rear of the trough. A head piece 51 bolted at one end to the guide member extends inwardly and overhangs the upper creasing roll 44. The ends of the head piece have socketed members 52 and 53 for the reception of compression springs 54 and 55, respectively. The spring 54 bears upon the block 49 while the spring 55 bears upon a depending bearing stem 56 slidably fitted in the socket member 53, which stem supports the free end of the stud 46. By this construction the upper creasing roll is urged normally toward the lower roll. The upper roll is loose on the shaft 46 and carries a pinion 569, and the lower roll together with a gear 57 is fast on the shaft 47, such gear 57 meshing with the pinion. The lower shaft 47 has also fast thereon a bevel gear 58 in mesh with a similar gear 59 fast on a shaft 60 having its bearing in a bracket 61 attached to the inner or front wall of the guide trough 38. Fast on the shaft 60 is a sprocket wheel 62 which is connected by a chain 63 with a sprocket wheel 64 fast on an extension of the usual intermittently driven shaft 65 at the rear of the booking machine, and therefore the creasing rolls are rotated step-by-step in timed relation to the travel of the carrier. (See Figs. 11, 12, 13, 15 and 16.)

To insure the accurate placement in relation to the creasing rolls of the open foldable ends of the respective covers during their progress, the inner or forward wall of the guide trough 38 has preferably secured thereto a bar section 66 having in the upper part of its inner side a longitudinal channel 67 for the reception of the proximate ends of the advancing covers, which channel affords a backer wall 68 extending in spaced parallel relation to the path of the carrier links and merging with a flaring portion 69 at the card receiving end of the channel. The channeled bar thus constitutes a stationary guide cam for the succeeding pairs of covers as they approach and pass the creasing station.

In the continued progress of the associated book elements they are presented to means including a pair of spaced reciprocating pushers for moving the match cards of each succeeding pair of links to the relative positions shown in Fig. 3, that is, inwardly a short distance beyond the fold lines of the open fold portions of the complementary covers. Each pusher comprises a slide 70 fitted in horizontal ways in a bracket structure 71 which is secured to the rear wall of the carrier guide trough 38, the forward or acting end of the slide underlying the projecting fold portion of the cover and being in the same horizontal plane as the bases of the match cards. Each of the pusher slides 70 is loosely connected with the upper end of a rock lever 72 which is pivotally supported on an extension of the bracket structure. On one side of the lever is a roll 73 which is operatively fitted in the race of a face cam 74 fast on a horizontal shaft 75 having its bearings in the bracket 71, the contour of the cam race being such that in an interval of each rotation of the cam the slide is reciprocated while a carrier link is in alinement with the slide. Hence the acting ends of the slides in their forward stroke abut the opposing ends of the match cards and push them forwardly in relation to the respective covers. (See Figs. 11, 12, 17, 18 and 19.)

A channeled bar section 660 (similar to section 66 previously described) is secured to the rear wall of the guide trough 38 in position to receive the proximate edges of the travelling covers and to ensure their accurate placement in relation to the respective slides 70.

Preferably the shaft 75 is geared with and driven from a continuously driven shaft 76 having its bearings in spaced stands 77 and 78 on a suitable bed plate 79 which is conveniently mounted on the frame structure 80 heretofore employed to support the wire stitching mechanism of the booking machine. In the present instance the shaft 76 has fast thereon a sprocket wheel 81 which is connected by a chain 82 with a sprocket wheel 83 fast on the shaft 75 so as to actuate the cams 74 in timed relation to the carrier. The shaft 76 has also fast thereon a bevel gear 84 in mesh with a similar gear 85 on a cross-shaft 86 having its bearings respectively in an arm 87 extending from the adjacent stand 77 and also in a companion stand 88 on the bed plate 79. A pulley 89 fast on the cross-shaft 86 is operatively connected with and driven from a suitably located shaft (not shown) of the booking machine.

In the construction illustrated in Figs. 11 and 12 the bed plate 79 supports a standard 790 having a bearing for the extended end of the intermittently driven shaft 65, which end bears a bevel gear 791 in mesh with a similar gear 792 on a transverse shaft 793 underlying the trough and having its bearings in an arm 794 extending from the standard 790 and in a spaced standard 795 also supported by the bed plate 79. The shaft 793 has fast thereon a timing gear 796 which extends through an opening in the bottom of the trough to mesh with the rack teeth of the carrier links in the usual manner. Also rising from the bed plate are spaced standards 797 which support the trough section 38.

The book elements having the match cards spaced from the free edge of the open cover fold, as seen in Fig. 3, progress to means including an applicator wheel 90 for applying a stripe of glue, or other adhesive material, to the under surface of each succeeding fold in a part of the space between the bases of the cards and the outer end of the fold portion, as previously mentioned. The wheel 90 is fast on one end of a shaft 91 journaled in a suitably-disposed bracket 92 fastened to the bottom of the carrier guide trough 38, the periphery (preferably finely serrated) of which wheel is supplied with a film of adhesive material which is brought in frictional rolling contact with each succeeding open cover fold. A pair of spaced knurled rolls 93 which overhang the wheel 90 are arranged to bear resiliently on the open fold and maintain it in efficient contact with the periphery of the applicator wheel. In the present instance the rolls are mounted on a shaft 94 fitted in spring pressed bearing blocks 95 slidably mounted in a bifurcated housing 96 having a supporting arm 97 which is secured to the outer wall of the guide trough. (See Figs. 11, 12 and 20.)

In the present instance the periphery of the wheel 90 intermittently rotates in a small quantity of liquid adhesive material, contained in a relatively small receptacle 98 having an overflow spout 99 adapted to ensure a constant level of the contained adhesive material in respect to the peripheral path of the wheel. The receptacle 98 is supported by a bracket member 980 having upstanding and depending lugs 981 and 982, respectively, one (981) of which lugs is fitted in a slotted projection 983 in a wall of the receptacle and the other (982) is fitted in a slotted projection 984 on the adjacent wall of the fountain 105. (See Figs. 20 and 21.) The outer end of the shaft 91 has fast thereon a bevel gear 100 in mesh with a similar gear 101 on an adjacent shaft 102 arranged in spaced parallel relation to the intermittently driven shaft 65 previously referred to, the two shafts 102 and 65 having thereon sprocket wheels 103 and 104, respectively, operatively connected by a chain 204. (See Figs. 11, 12 and 20.) Thus the intermittent motion of the shaft 65 is transmitted to the applicator wheel 90 in timed relation to the carrier of the booking machine.

The spout 99 overhangs a glue fountain 105 and delivers the overflow thereto of the liquid adhesive material from the receptacle 98, which fountain is suitably mounted on the bed plate 79.

The lower peripheral portion of a continuously rotating transfer wheel 106 runs within the fountain and transfers adhesive material therefrom to an upper inclined trough 107, whence it flows to the receptacle 98. In the present instance the transfer wheel 106 is fast on one end of a shaft 108 journaled in a suitable bearing 109 supported by one wall of the fountain, the outer end having a pulley 110 which is operatively connected with and driven from a convenient rotating shaft (not shown) of the booking machine.

The higher or receiving end of the trough 107 comprises a horizontal bottom extension 111 having a free lateral edge portion 112 which lies adjacent the peripheral path of the transfer wheel 106 and serves to scrape from the descending periphery of the wheel the glue or the like and direct it to the inclined trough. The bottom extension of this trough is conveniently secured to one end of a bar 113 extending from the lower horizontal arm of a Z-bracket 114 which is supported by the carrier guide trough 38 of the booking machine. This arm also supports a bifurcated scraper 115 which straddles the applicator wheel in its upward travel from the receptacle 98, thus ensuring a determined uniform film of glue on the periphery of such wheel. (See Figs. 11, 12, 20 and 21.)

In the continued progress of the associated book elements the projecting fold portion of each succeeding cover engages a suitable folding element which flexes such portion inwardly (as seen in Fig. 5) toward the bases of the match cards in order to afford a pocket or casing having adhesive material on its upper and lower inner surfaces.

The folding element illustrated comprises a finger 116 having a lug 117 which is affixed to the rear of the carrier guide trough of the booking machine. This finger extends longitudinally of the guide trough and curves upwardly from the lug 117 to present an under surface rising above the path of the advancing foldable portion of the cover, so that as the carrier progresses such portion, impinging the opposing curved surface of the finger, is gradually bent downwardly. Underlying the finger 116 is a longitudinally extending member 118, preferably wire, which terminates in a downwardly curved end portion 119 short of the free end of the finger and in the path of the depending fold portion of the cover, which fold portion in its travel impinges the member 118 and is thereby bent upwardly to complete the fold. This done the folded end of the cover, entering the beveled or flaring mouth 120 of a longitudinal channel provided by an extension 121 of the finger 116 on the adjacent wall of the carrier guide trough, is maintained in folded condition. (See Figs. 22, 23 and 24.)

The book elements progress to means including a pair of spaced reciprocative pushers for moving back into the folded portions of the covers the match cards carried by each succeeding pair of links with the leading end of the upper card of each book offset slightly in advance of the adjacent end of its companion and in contact with the bend of the cover fold, thus providing at the base ends of the cards of each book assembly the step-like channel y (Fig. 9) into which a portion of the adhesive material scraped by the edges of the bases from the inner surfaces of the end pocket of the cover is deposited, as previously mentioned. At this stage, as seen in Figs. 22 and 24, the folded ends of the covers with the match cards seated therein project rearwardly beyond the carrier links, the curved end 37 of the leaf spring 35 within each of the links bearing against the opposing match splints within the link.

Each pusher comprises a slide 122 fitted in horizontal ways in a bracket structure 71a which is secured to the front of the carrier guide trough, the acting end of the slide, which moves toward and from the head ends of the matches, having an offset or stepped surface 123 the risers of which impinge the heads of the upper and lower matches of the respective cards. (See Figs. 22, 25 and 26.)

The mechanism illustrated for reciprocating the paired slides 122 in timed relation to the carrier needs no special description, since such mechanism includes the continuously rotating actuating shaft 76 and corresponds in general construction and operation with the mechanism previously described in connection with the slides 70. The corresponding parts are indicated in the drawings by like reference numerals save that the letter a is added to the numerals designating the elements for reciprocating the slides 122.

The folded ends of the two covers when the respective match cards are advanced by the slides 122 abut resilient backer bars 124 at the rear of the carrier guide trough of the booking machine, each of which bars has a forward lip 125 adapted to overhang the folded end of the cover and prevent upward displacement of such end. Each bar is supported by a pair of parallel rods 126 slidably mounted in a suitably located bracket 127 attached to the rear of the guide trough, which bracket is suitably bored to receive the rods and also compression springs 128 which, encircling the rods, normally urge the adjacent bar toward the carrier. Pins 129 at the rearwardly projecting ends of the rods abut the end of the bracket and thus limit the forward movement of the rods and their respective bars 124. (See Figs. 22 and 25.)

The associated book elements progress to means including a pair of spaced reciprocative pushers for moving such elements longitudinally of the links a sufficient distance to place the cover folds flatwise against the curved ends 37 of the springs 35 of the respective links, which springs thus pinch the glue-coated surfaces of the covers and the enclosed bases of the cards in intimate contact, and at the same time force the glue at the bend of the fold between the bases of the combined covers in each of the links, as previously mentioned. In the present instance the projected folded ends of the covers are moved by the pushers flush or substantially so with the respective links. (See Figs. 27, 28 and 29.)

Each pusher comprises a slide 130 fitted in horizontal ways in a bracket structure 71b which is secured to the rear wall of the carrier guide trough 38. The acting end of the slide, which moves toward and from the folded ends of the covers, consists of a T-head whereof the shank 131 is affixed to the body of the slide, the cross piece 132 of the head in its forward stroke abutting the folded ends of the covers, and the free end of the shank 131 projecting beyond the crosspiece in a manner to overlap the adjacent fold end of the book and support it in the space between the flanges 33 of the side walls 32 of the carrier link, thus serving in conjunction with the flanges to hold the end fold of the cover in opposition to the pressure of the leaf spring 35.

The mechanism illustrated for reciprocating the paired slides 130 includes the continuously rotating actuating shaft 76 and also corresponds in general construction and operation with the mechanism previously described in connection with the slides 70, the corresponding parts being indicated in the drawings by like reference numerals save that the letter b is added to the numerals designating the elements for reciprocating the slides 130.

After the carrier has travelled a sufficient distance to ensure the setting of the adhesive material while the associated covers and the bases of the match cards are under pressure by the leaf springs 35 of the links, such covers and their contents may be again endwise shifted by any suitable means to project the folded ends of the cards rearwardly of the links and in position to receive a coat of friction material (S, Fig. 10) at the usual "painting" station, if desired. Thence the match books travel through an extended drying space to the final station where mechanism of known construction folds the extended flap ends of each succeeding pair of covers upon the contained matches and tucks such flap ends under the free uncoated edges of the cemented end folds (c) of the cover, thus completing the booking operation.

I claim:

1. A method of binding a match book assembly comprising a flexible cover having a fold at one end and a plurality of match cards having their base portions interposed between the body of the cover and the end fold, which consists in opening the cover fold, relatively shifting the cover and match cards to position the bases of the cards beyond the hinge of the open foldable portion of the cover, applying adhesive material to the inner surface of said open portion and the adjacent surface of the body of the cover, folding said open portion toward the bases of the matches, relatively shifting the match cards and the cover to insert the bases of the match cards between and in scraping contact with the inner coated surfaces of the fold and the body of the cover, and then subjecting to lateral pressure the folded base end of the assembly.

2. A method of binding a match book assembly comprising a flexible cover having a fold at one end and a plurality of match cards having their base portions interposed between the body of the cover and the end fold, which consists in opening the cover fold, relatively shifting the cover and match cards to position the bases of the cards beyond the hinge of the open foldable portion of the cover, applying adhesive material to the inner surface of said open portion and the adjacent surface of the body of the cover, folding said open portion toward the bases of the matches, relatively shifting the match cards and the cover to offset the match cards and insert their bases between and in scraping contact with the inner coated surfaces of the fold and the body of the cover, and then subjecting to lateral pressure the folded base end of the assembly.

3. In a method of binding a match book assembly comprising a flexible cover and a plurality of match cards, the steps of applying adhesive material to the inner surface of a portion of the cover, folding said portion to provide a pocket having adhesive material on its opposite inner surfaces, inserting in said pocket and in scraping contact with the embracing coated surfaces of the cover the bases of a plurality of superposed match cards arranged flatwise of the cover, and then subjecting to lateral pressure the folded base end of the assembly.

4. In a method of binding a match book assembly comprising a flexible cover and a plurality of match cards, the steps of applying adhesive material to the inner surface of a portion of the cover, folding said portion to provide a pocket having adhesive material on its opposite inner surfaces, inserting in said pocket and in scraping contact with the embracing coated surfaces of the cover the bases of a plurality of superposed match cards arranged flatwise of the cover and with the leading ends of the bases of the cards in offset relation, and then subjecting to lateral pressure the folded base end of the assembly.

5. In a match booking machine having a travelling carrier comprising a succession of holders each having a pressure member for resiliently holding a match book assembly comprising a flexible cover having a fold at one end and a plurality of match cards having their base portions interposed between the body of the cover and the end fold, means for opening the end fold during the progress of the carrier, means for relatively shifting the cover and match cards beyond the hinge of the open foldable end of the cover, means for applying adhesive material to the inner surface of said open end and the adjacent surface of the body of the cover, means for folding said open end toward the bases of the match cards, means for relatively shifting the match cards and the cover to insert the bases of the match cards between and in close relation to the spaced inner coated portions of the fold and the body of the cover, and means for bodily shifting the assembly to present the fold of the cover to the action of the adjacent pressure member of the carrier.

6. In a match booking machine having a travelling carrier comprising a succession of holders each having a pressure member for resiliently holding a match book assembly comprising a flexible cover having an end fold and a plurality of match cards having base portions interposed between the body of the cover and the end fold, means consisting of a stationary tapering or inclined finger supported laterally of the path of the carrier to receive and open the said end fold during the progress of the carrier, means for relatively shifting the cover and match cards beyond the hinge of the open foldable end of the cover, means for applying adhesive material to the inner surface of said open end and the adjacent surface of the body of the cover, means for folding said open end toward the bases of the match cards, means for relatively shifting the match cards and the cover to insert the bases of the match cards between and in close relation to the spaced inner coated portions of the fold and the body of the cover, and means for bodily shifting the assembly to present the fold of the cover to the action of the adjacent pressure member of the carrier.

7. In a match booking machine having a travelling carrier comprising a succession of holders each having a pressure member for resiliently holding a match book assembly comprising a flexible cover having an end fold adapted to project beyond the carrier, and means for associating with said cover match cards having base portions interposed between the body of the cover and the end fold, means for opening the end fold during the progress of the carrier, means including a reciprocative slide for shifting the match cards longitudinally of the cover and beyond the hinge of the open foldable end of the cover, means for applying adhesive material to the inner surface of said open end and the adjacent surface of the body of the cover, means for folding said open end toward the bases of the match cards, means for relatively shifting the match cards and the cover to insert the bases of the match cards between and in close relation to the spaced inner coated portions of the fold and the body of the cover, and means for bodily shifting the assembly to present the fold of the cover to the action of the adjacent pressure member of the carrier.

8. In a match booking machine having a travelling carrier comprising a succession of holders each having a pressure member for resiliently holding a match book assembly comprising a flexible cover having an end fold adapted to project beyond the carrier and a plurality of match cards having base portions interposed between the body of the cover and the end fold, means for opening the end fold during the progress of the carrier, means for relatively shifting the cover and match cards beyond the hinge of the open foldable end of the cover, means for applying adhesive material to the inner surface of said open end and the adjacent surface of the body of the cover, means for folding said open end toward the bases of the match cards, means including a reciprocative slide for shifting the match cards longitudinally of the cover to insert the bases of the cards between and in close relation to the spaced inner coated portions of the fold and the body of the cover, and means for bodily shifting the assembly to present the fold of the cover to the action of the adjacent pressure member of the carrier.

9. In a match booking machine having a travelling carrier embodying a succession of holders each adapted to support a match book assembly comprising a flexible cover and a plurality of match cards in superposed relation, said cover having a foldable end portion spaced from the bases of the match cards, means for applying adhesive material to the inner surface of the foldable end portion and the adjacent surface of the body of the cover of each succeeding assembly, means for flexing said foldable cover portion toward the bases of the match cards of the assembly, and means for relatively shifting the match cards and the cover endwise to insert the bases of the cards between and in scraping contact with the coated surfaces of the cover fold and the body of the cover.

10. In a match booking machine having a travelling carrier embodying a succession of holders each adapted to support a match book assembly comprising a flexible cover and a plurality of match cards in superposed relation, said cover having a foldable end portion spaced from the bases of the match cards, means for applying adhesive material to the inner surface of the foldable end portion and the adjacent surface of the body of the cover of each succeeding assembly, means for flexing said foldable cover portion toward the bases of the match cards of each assembly, and means including a pusher member for relatively shifting the match cards in offset relation and inserting the bases of the cards between and in scraping contact with the coated surfaces of the cover fold and the body of the cover.

11. In a match booking machine having a travelling carrier comprising a succession of holders, each holder including a pressure member for acting upon a cover and a plurality of match cards in superposed relation, said cover having a foldable end portion spaced from the bases of the match cards, means for applying adhesive material to the inner surface of said foldable portion and the adjacent surface of the cover, means for flexing said foldable cover portion toward the bases of the match cards, means for relatively shifting the match cards and the cover endwise between and in contactual relation with the coated surfaces of the cover fold and the body of the cover, and means for thereafter bodily shifting the assembly to present the cover fold to the action of the adjacent pressure member of the carrier.

12. In a match booking machine having a travelling carrier comprising a succession of holders each having a pressure member for holding a cover having a foldable end portion, and means for associating with said cover match cards having base portions in proximity to the hinge of said foldable end portion, means for relatively shifting the cover and match cards to space the base portions of said cards beyond the hinge of the foldable portion, means for applying adhesive material to the inner surface of said foldable portion and the adjacent surface of the cover, means for flexing said foldable portion toward the bases of the match cards, means for relatively shifting the match cards and the cover to insert the bases of the match cards between and in close relation to the spaced coated inner surfaces of the fold and the body of the cover, and means for bodily shifting the associated cover and cards to present the fold of the cover to the action of the pressure member of the holder by which said cover and match cards are supported.

13. In a match booking machine having a travelling carrier comprising a succession of holders each having a pressure member for resiliently holding a match book assembly comprising a flexible cover having an end fold adapted to project beyond the carrier, and means for associating with said cover a plurality of match cards having base portions interposed between the body of the cover and the end fold, means for opening the end fold during the progress of the carrier, means for relatively shifting the cover and match cards beyond the hinge of the open foldable end of the cover, means for applying adhesive material to the inner surface of said open end and the adjacent surface of the body of the cover, means for folding said open end toward the bases of the match cards, means for relatively shifting the match cards and the cover to insert the bases of the match cards between and in close relation to the spaced inner coated portions of the fold and the body of the cover, and means including a reciprocative slide for bodily shifting the assembly to present the fold of the cover to the action of the adjacent pressure member of the carrier.

EDGAR A. ALLEN.